United States Patent [19]

Zuzuly

[11] Patent Number: 5,179,495
[45] Date of Patent: Jan. 12, 1993

[54] SOLID STATE OVERLOAD RELAY

[75] Inventor: Daniel Zuzuly, Geneva, Ill.

[73] Assignee: Furnas Electric Company, Batavia, Ill.

[21] Appl. No.: 561,952

[22] Filed: Aug. 2, 1990

[51] Int. Cl.⁵ .................. H02H 3/00; H02H 7/00; H02H 9/02
[52] U.S. Cl. .................................................. 361/94
[58] Field of Search .................. 361/94, 57, 44, 78, 361/47, 35, 36, 38, 72, 90, 96

[56] References Cited

U.S. PATENT DOCUMENTS

| | | | |
|---|---|---|---|
| 4,041,540 | 8/1977 | Kampf et al. | 361/96 |
| 4,048,663 | 9/1977 | Lemke | 361/75 |
| 4,054,932 | 10/1977 | Sehmer et al. | 361/31 |
| 4,345,288 | 8/1982 | Kampf et al. | 361/94 |
| 4,446,498 | 5/1984 | Stich | 361/87 |
| 4,539,618 | 9/1985 | Stich | 361/94 |
| 4,630,163 | 12/1986 | Cooper et al. | 361/56 |
| 4,901,005 | 2/1990 | Shin et al. | 324/86 |

Primary Examiner—R. Skudy
Assistant Examiner—E. H. To
Attorney, Agent, or Firm—Wood, Phillips, VanSanten, Hoffman & Ertel

[57] ABSTRACT

A self-powered multiple phase ciruict protection device including a plurality of current transformers (16, 18, 20) connected and parallel with each other and adapted to be individually associated with one phase (10, 12, 14) of a multiple phase load and for providing signals $I_a$ $I_b$, $I_c$ representing the current flowing in an associated phase. A switch (62) is adapted to be actuated to interrupt power to the multiple phase load and a fault determining circuit (45) is connected to the circuit transformers (16, 18, 20) and to the switch (62) for actuating the switch (62) for at least one predetermined condition of the current signals $I_a$, $I_b$, $I_c$. A power supply (34) is provided for the fault determining circuit (45) and has an input connected to all of the current sensors and an electrical clamp (36) is connected to the power supply input.

17 Claims, 2 Drawing Sheets

SOLID STATE OVERLOAD RELAY

FIELD OF THE INVENTION

This invention relates to overload relays usable with electric equipment, and more particularly, to a solid state, multiple phase overload relay.

BACKGROUND OF THE INVENTION

Overload relays of various sorts have long been utilized in connection with the operation of electrical equipment, particularly electrical equipment drawing relatively high levels of power. Various devices have been utilized to sense a current flow and to trip a switch or the like when the current level exceeds some predetermined value. Frequently, electromechanical devices employing heaters have been utilized for the purpose. Frequently also, overload circuits of this type require an external source of power to drive a current interrupting switch when an overload has been sensed.

While, in many instances, such prior devices perform their intended functions well, they are not without their undesirable features. For example, in the case of those systems requiring an external source of power, if the external power source fails for any reason, it is either impossible to trip the circuit in response to an overload or a trip occurs when no overload is, in fact, occurring. Those systems employing heaters tend to be bulky in order to house the heater and a bimetal typically associated therewith. Moreover, concern must be given in their design for a means to dissipate heat at a relatively uniform rate so as to enable them to function accurately when reset immediately following a trip.

Many examples of prior art overload relays of the type generally discussed above, also do not provide protection against the loss of a phase when the overload relays are utilized in monitoring a multi-phase load. While loss of a phase will typically result in a substantial increase in the current flowing in the remaining phases which will ultimately lead to a trip of the relay, it is desirable to trip the overload relay much more rapidly when a phase is lost so as to prevent any overheating due to excessive current flow of the operative phases within the load.

The present invention is directed to overcoming these and other problems.

SUMMARY OF THE INVENTION

It is the principal object of the invention to provide a new and improved overload protector. More specifically, it is an object of the invention to provide an overload protector, fabricated generally of solid state components that is of minimal bulk, does not require provision for heat dissipation, and which is self-powered.

According to one facet of the invention, one or more of the foregoing objects is obtained in a overload relay construction including a plurality of current sensing circuits, each adapted to be associated with a phase input to a multiple phase load to be monitored to provide a signal representative of the current to the respective phase input. Summing means are provided for receiving those signals and providing a signal related to the average current to the phase inputs. A power supply is operative to provide a reference signal and an RC circuit is connected to the summing means. A comparator is connected to both the power supply and the RC circuit for comparing a signal from the latter to the reference signal and providing an overload signal when the average current signal is indicative of an overload. A switch is responsive to the overload signal and is adapted to be employed to interrupt the flow of power to the load with which the overload relay may be associated.

Preferably, the power supply is connected to the current sensors to receive electrical power therefrom. In a highly preferred embodiment, the current sensors are current transformers and are connected with each other in parallel and in turn connected in series with the power supply and input thereto.

A highly preferred embodiment includes a voltage clamping device connected between the current transformer and the power supply. In the preferred embodiment, the clamping device is a Zener diode.

The invention also contemplates the provision of a lockout circuit having a first input connected to the power supply to receive supply voltage therefrom and a second input for receiving the reference signal inoperative to provide an enabling signal when the supply voltage is at or above a predetermined level and the reference signal is steady. A logical AND means is disposed between the lockout circuit and the switch and receives the enabling signal and the overload signal The same is operative to actuate the switch only in response to the presence of both such signals.

In one embodiment of the invention, a one shot is connected in circuit between the switch and the AND means.

The invention also contemplates the provision of means connected to the current sensing devices, specifically, circuit transformers, and to the summing means for sensing the loss of a phase at any one of the phase inputs and for providing a signal to the one shot to operate the switch.

According to another facet of the invention, there is provided a plurality of sensing circuits and a summing means as before. A plurality of comparators is provided, one for each phase of the load and an input circuit is provided for each comparator. Each input circuit is connected to a corresponding current sensing circuit to receive the current signal for the associated phase and to the summing means to receive the average current signal and provide a signal related to the sum thereof to the corresponding comparator. An AND means is connected to the AND comparators. A switch in turn is connected to the AND means and is operative to cause interruption of power to the load with which the current sensors are associated upon loss of a phase at any one of the current sensors.

In a preferred embodiment, pulse extend circuits are interposed between the comparators and the AND means, and convert pulse trains from the comparators to DC signals to indicate if current is present in the corresponding leg.

Preferably, an RC circuit is connected between the AND means and the switch.

In a highly preferred embodiment, pulse extending circuits are connected between each of the comparators and the AND means.

According to still another facet of the invention, there is provided a self-powered multiple phase circuit protection device which includes a plurality of current transformers connected and parallel with each other and adapted to be individually associated with one phase of a multiple phase load and to provide signals representative of the current flowing in the associated phase. A switch adapted to be actuated to interrupt power to the multiple phase load is also provided and a fault determining circuit is connected to the current transformers to receive the current signals and to the switch for actuating the switch for at least one predetermined condition of the current signals. A power supply is provided for the fault determining circuit and has an input connected to all of the current sensors. An electrical clamp in turn is connected to the power supply input.

Where the fault determining circuit is employed to sense an overload, the same is preferably provided with memory means for remembering prior actuation of the switch and for actuating the switch with greater rapidity if the switch has been previously actuated in a given previous time period. Preferably, the memory means comprises an RC circuit.

Other objects and advantages will become apparent from the following specification taken in connection with the accompanying drawings.

DESCRIPTION OF THE PREFERRED EMBODIMENT

Figure 1:
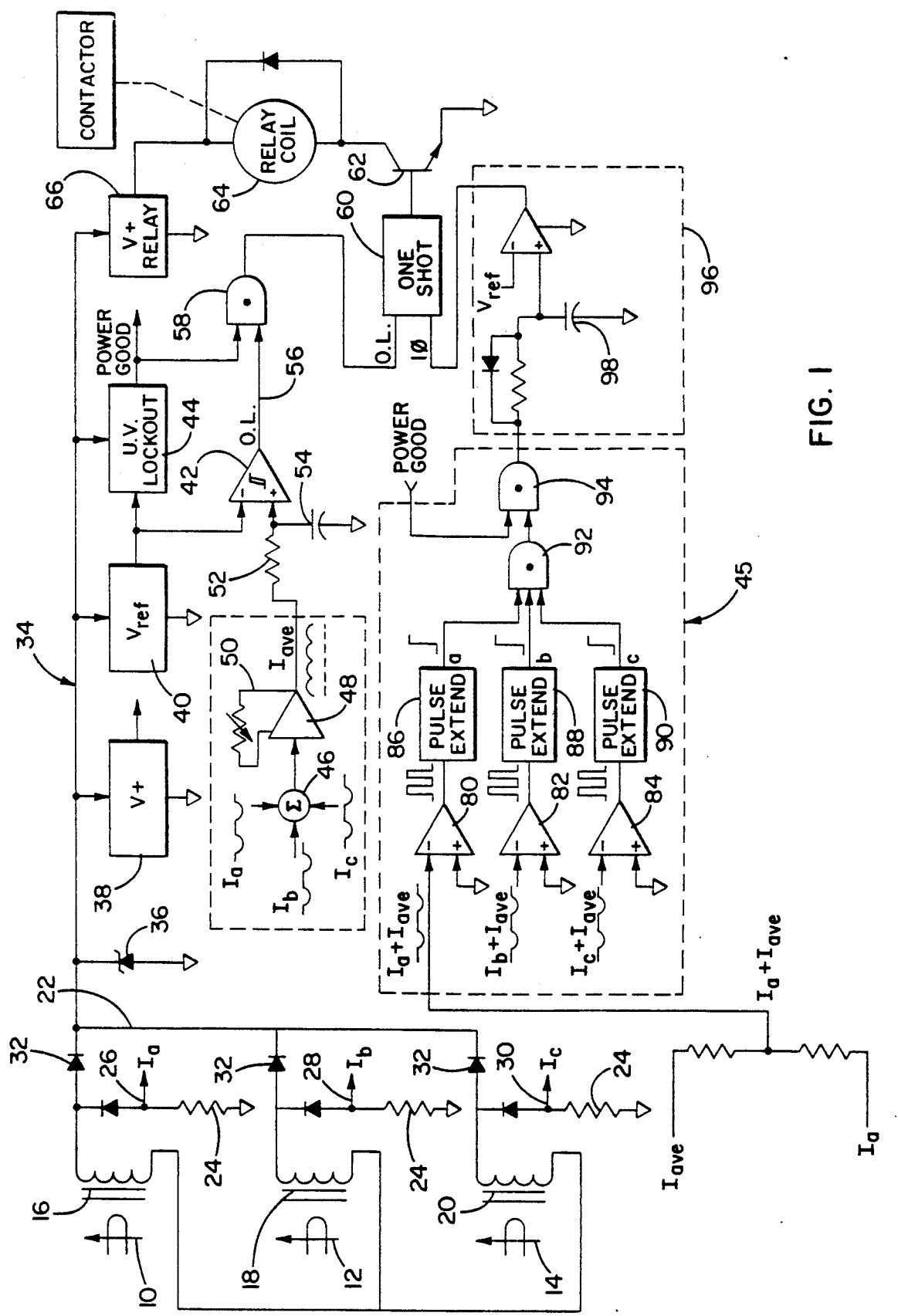
FIG. 1 is a block diagram of an overload relay made according to the invention.
Figure 2:
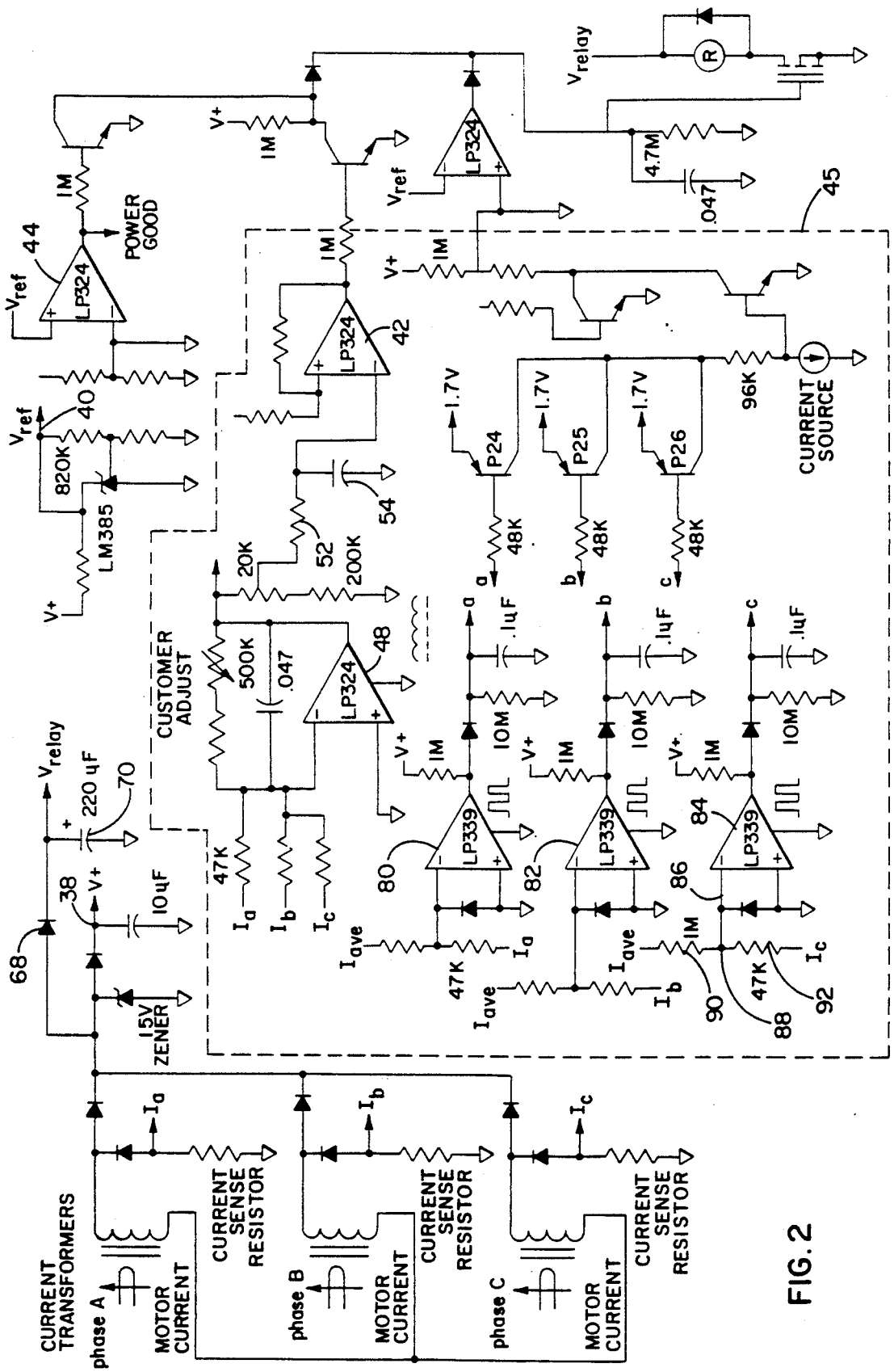
FIG. 2 is an electrical schematic of the overload relay.

An exemplary embodiment of an overload relay made according to the invention is illustrated generally in block form in FIG. 1 and in schematic form in FIG. 2. The same is generally intended to be coupled to a three phase load although its use is not limited thereto. Phase conductors are shown at 10, 12 and 14 and are connected to the load (not shown). Individual current transformers 16, 18, 20 are respectively associated with the conductors 10, 12, 14 and are connected in parallel by a conductor 22.

Associated with each current transformer 16, 18, 20, is a current sensing resistor 24. Located between each current transformer 16, 18, 20 and its associated current sensing resistor 24 is a junction 26, 28 or 30 from which a signal representative of the current flowing through the associated phase may be taken. Diodes 32 serve as rectifiers for the signals for each of the phases such that a direct current signal is present on the line 22, which in turn is connected to a power supply circuit, generally designated 34. An electrical clamp in the form of a Zener diode 36 is located between the current transformers 16, 18, 20 and the power supply 34, specifically, between the rectifier defined by the diodes 32, and the power supply 34.

The power supply 34 includes a first section 38 which provides power to the various components of the circuit illustrated in FIG. 2 having the designations V+ to power the same. A second section 40 is operative to provide a reference voltage. The reference voltage is fed to a comparator 42 for purposes to be seen as well as to a lockout circuit 44.

The lockout circuit 44 is also connected to receive power from the power supply 38 and is operative to provide, as indicated in FIG. 1, a "power good" signal whenever the voltage input level received from the power supply 38 is at or above a predetermined value and the reference voltage signal received from the circuit 40 is steady. The lockout circuit 44 is utilized to prevent false tripping of the overload relay if the reference signal is not stable.

The relay includes a fault detecting circuit, generally designated 45. In it signals from the junctions 26, 28 and 30, which are negative, are fed to a summing junction 46, which is connected as an input to an inverting operational amplifier 48 having an adjustable feedback 50. The resulting positive output from the operational amplifier 48 will be proportional to the average current flowing on each of the conductors 10, 12 and 14. It is to be noted that the positive power supply terminal for the operational amplifier 48 is connected to the power supply section 38 while the negative power supply terminal is connected to ground rather than a negative supply. This feature simplifies the overall circuitry. The output of the amplifier 48 is connected to an RC circuit made up of a resistor 52 and a capacitor 54 which are in turn connected to an input of the comparator 42.

The arrangement is such that when the signal indicative of the average current exceeds the reference level signal by a predetermined amount, an overload signal will be issued on the output 56 of the comparator 42. The output 56 in turn is connected as an input to an AND gate 58 along with an input from the lockout circuit 44 indicating when the power level is good. If both conditions are present, the AND gate 58 provides an overload signal to a conventional one shot 60. The one shot 60 in turn is operative to initiate conduction of a transistor switch 62 placed in series with a trip coil 64 and a trip coil power supply circuit 66. As seen in FIG. 2, the circuit 66 may include a diode 68 and a capacitor 70.

In any event, the overload signal is operative to trigger the one shot 60 which will cause the transistor switch 62 to conduct and energize the trip coil 64 to cause mechanical tripping of the relay in a conventional manner. The one shot 60 is utilized to provide a pulse to the switch 62 of sufficient length to enable operation of the trip coil 64 even though the pulse width from the AND gate 58 may be insufficient to assure tripping of the relay.

It should be observed that the RC circuit made up of the resistor 52 and the capacitor 54 provides a memory for remembering if there has been a trip within a predetermined time period and causing the circuit to trip with greater rapidity if such has been the case. The time constant of the RC circuit including the resistor 52 and the capacitor 54 is relatively large so as to provide for a relatively slow discharge of the capacitor 54. Consequently, if there has been a previous trip shortly before that determined by another increase in the average current, the capacitor 54 will not be completely discharged and will more rapidly charge to the level that will ultimately trigger the one shot 60. Clearly, the less the elapsed time between the present trip and the preceding trip, the more rapidly the present trip will occur. This feature is designed to prevent overheating of the load as would be the case if the trip time remained constant in all circumstances. In such a case, trips occurring within a short time of one another would not permit sufficient cooling of the load, such that damage could result.

The invention also provides a mean for tripping when one or more of the phases is lost. That is to say, if power on one of the conductors 10, 12 or 14 ceases, that condition is sensed and will cause a trip independently of any corresponding increase in the two remaining operative phases.

In particular, a series of three comparators 80, 82 and 84 are respectively connected to receive signals indicative of the sum of the current through the associated phase and the average current through all phases as illustrated in FIG. 1. As can be appreciated from FIG. 2, the input to the comparator 84 is on a conductor 86 which in turn is connected to a junction 88 of two resistors 90 and 92. The resistor 92 may be connected to the output of the operational amplifier 48 to receive the average current signal therefrom while the resistor 92 may also be connected to the junction 30 to receive the signal representing current in the associated phase therefrom. Like conductors and resistors similarly connected provide inputs to the comparators 80 and 82.

The outputs from the comparators 80, 82 and 84 are connected to respective pulse extending circuits 86, 88 and 90. The pulse extending circuits 86, 88 and 90 may be simple RC circuits having a time constant that need only be sufficiently long to smooth out fluctuations in the output of the corresponding comparator for digital logic purposes.

The pulse extenders 86, 88 and 90 are connected to the inputs of an AND gate, generally designated 92, which in turn is connected to an AND gate 94 which also receives a signal from the lockout circuit 44 to indicate that power is good.

Thus, it will be appreciated that when one of the phases is lost and when the reference signal is stable, the AND 94 will provide an output to an RC circuit 96. The circuit 96 is a phase loss timing circuit and includes a capacitor 98 which may be termed a phase loss timing capacitor. The arrangement is such that a relatively small time constant is involved so that upon the determination that phase has been lost, in very relatively short order, a signal will be provided by the circuit 96 to the one shot 60 to again cause the switch 62 to conduct and energize the relay coil 64 to trip the relay.

From the foregoing, it will be appreciated that an overload relay made according to the invention eliminates any need for heaters, the volume to house the same or any means to dissipate heat therefrom Furthermore, the same provides for tripping in the event of a phase loss independently of any increase in current levels to the remaining operative phases so as to allow rapid disconnection before any part of the load can overheat.

The memory feature provided by the RC circuit including the resistor 52 and capacitor 54 provides for rapid trips in the event trips have been frequent and slower trips when trips have not been previously occurring. Indeed, it can be demonstrated that the trip characteristics of the system may be very well matched to time versus current curves as desired.

The invention also provides a self-powered overload protector which does not rely on a separate power source. Consequently, reliability is enhanced and false trips avoidable.

Finally, while the invention has been described as being an overload protector for a multiple phase load, those skilled in the art will be appreciated that the same may find utility in single phase load protection. In such a case, it is only necessary to pass a single phase conductor through the three current transformers 16, 18, 20 to achieve the benefits of the invention as far as overload protection is concerned.

I claim:

1. A solid state overload relay comprising:

a plurality of current sensing circuits, each adapted to be associated with a respective phase input to a multiple phase load to be monitored, for providing a signal representative of the current to the respective phase input;

summing means for receiving said signals and for providing a signal related to an average current to the phase inputs;

a power supply operative to provide a reference signal and connected to said current sensing circuits to receive electrical power therefrom; p1 an RC circuit connected to said summing means;

a comparator connected to both said power supply and said RC circuit or comparing a signal from the latter to said reference signal and providing an overload signal when the signal related to the average current is indicative of an overload; and a switch responsive to said overload signal and adapted to be employed to interrupt the flow of power to the load with which said overload relay may be associated.

2. A solid state overload relay comprising:

a plurality of current sensing circuits, each adapted to be associated with a respective phase input to a multiple phase load to be monitored, for providing a signal representative of the current to the respective phase input;

summing means for receiving said signals and for providing a signal related to an average current to the phase inputs;

a power supply operative to provide a reference signal;

an RC circuit connected to said summing means;

a comparator connected to both said power supply and said RC circuit for comparing a signal from the latter to said reference signal and providing an overload signal when the signal related to the average current is indicative of an overload; and a switch responsive to said overload signal and adapted to be employed to interrupt the flow of power to the load with which said overload relay may be associated;

said current sensing circuits including current transformers and being connected in parallel with each other and in turn connected in series with said power supply.

3. The solid state overload relay of claim 2 further including a voltage clamping device connected between said current transformers and said power supply.

4. The solid state overload relay of claim 3 wherein said clamping device is a Zener diode.

5. A solid state overload relay comprising:

a plurality of current sensing circuits, each adapted to be associated with a respective a phase input to a multiple phase load to be monitored, for providing a signal representative of the current to the respective phase input;

summing means for receiving said signals and for providing a signal related to an average current to the phase inputs;

a power supply operative to provide a reference signal;

an RC circuit connected to said summing means;

a comparator connected to both said power supply and said RC circuit for comparing a signal from the latter to said reference signal and providing an overload signal when the signal related to the average current is indicative of an overload;

a switch responsive to said overload signal and adapted to be employed to interrupt the flow of power to the load with which said overload relay may be associated; and a lockout circuit having a first input connected to said power supply to receive supply voltage therefrom and a second input for receiving said reference signal and operative to provide an enabling signal when said supply voltage is at or above a predetermined level and said reference signal is steady, and logical AND means between said lockout circuit and said comparator for receiving said enabling signal and said overload signal, and operating said switch only in response to the presence of both.

6. The solid state overload relay of claim 5 further including a one shot connected in circuit between said switch and said AND means.

7. The solid state overload relay of claim 6 further including means connected to said current transformers and to said summing means for sensing the loss of a phase at any one of said phase inputs and for providing a signal to said one shot to operate said switch.

8. A solid state overload relay comprising:

a plurality of current sensing circuits, each adapted to be associated with a respective phase input to a multiple phase load to be monitored, for providing a signal representative of the current to the respective phase input;

summing means for receiving said signals and for providing a signal related to an average current to the phase inputs;

a plurality of comparators, one for each phase;

an input circuit for each said comparator and connected to a corresponding current sensing circuit to receive the current signal for the associated phase and to said summing means to receive the signal related to the average current and to provide a signal related to the sum thereof to the corresponding comparator;

AND means connected to said comparators; and a switch connected to said AND means and operative to cause inter of power to the load with which said current sensing circuits are associated upon the loss of a phase at any one of said current sensing circuits.

9. The solid state overload relay of claim 8 further including an RC circuit connected between said AND means and said switch.

10. The solid state overload relay of claim 8 including pulse extending circuits connected between each of said comparator and said AND means.

11. A self-powered multiple phase circuit protection device including:

a plurality of current transformers connected in parallel with each other and each adapted to be individually associated with a respective one phase conductor of a multiple phase load and for providing signals representative of the current flowing in the associated phase conductor;

a switch adapted to be actuated to interrupt power to the multiple phase load;

a fault determining circuit connected to said current transformers to receive said current signals and to said switch for actuating said switch for a least one predetermined condition of said current signals;

a power supply for said fault determining circuit and having an input connected to all of said current transformers; and an electrical clamp connected to said power supply input.

12. The self-powered multiple phase circuit protection device of claim 11 wherein said electrical clamp is a Zener diode.

13. The self-powered multiple phase circuit protection device of claim 11 wherein said fault determining circuit actuates said switch in response to loss of a phase.

14. The self-powered, multiple phase circuit protection device of claim 11 wherein said fault determining circuit actuates said switch in response to excess current flow to said load.

15. The self-powered multiple phase circuit protection device of claim 14 wherein said fault determining circuit actuates said switch in response to loss of a phase.

16. The self-powered multiple phase circuit protection device of claim 14 wherein said fault determining circuit includes memory means for remembering prior actuations of said switch and for actuating said switch with greater rapidity if said switch has been previously actuated in a given previous time period.

17. The self-powered multiple phase circuit protection device of claim 16 wherein said memory means comprises an RC circuit.

* * * * *